(12) United States Patent
Kaplan

(10) Patent No.: US 12,008,707 B2
(45) Date of Patent: Jun. 11, 2024

(54) HIGHLY SCALABLE CLUSTER ENGINE FOR HOSTING SIMULATIONS OF OBJECTS INTERACTING WITHIN A SPACE

(71) Applicant: David Todd Kaplan, Hawthorne, NJ (US)

(72) Inventor: David Todd Kaplan, Hawthorne, NJ (US)

( * ) Notice: Subject to any disclaimer, the term of this patent is extended or adjusted under 35 U.S.C. 154(b) by 1205 days.

(21) Appl. No.: 16/726,188

(22) Filed: Dec. 23, 2019

(65) Prior Publication Data

US 2020/0143586 A1 May 7, 2020

Related U.S. Application Data

(63) Continuation-in-part of application No. 14/180,568, filed on Feb. 14, 2014, now Pat. No. 10,521,520.

(60) Provisional application No. 61/764,673, filed on Feb. 14, 2013.

(51) Int. Cl.
*G06T 15/40* (2011.01)
*A63F 13/58* (2014.01)
*G06T 3/16* (2024.01)

(52) U.S. Cl.
CPC .............. *G06T 15/40* (2013.01); *A63F 13/58* (2014.09); *G06T 3/16* (2024.01); *G06T 2210/21* (2013.01)

(58) Field of Classification Search
CPC ... G06T 15/40; G06T 3/0087; G06T 2210/21; G06T 19/00; G06T 2210/12; G06F 3/011; G06F 3/016; G06F 3/015; A63F 13/35; A63F 13/573; A63F 13/58; A63F 13/60
See application file for complete search history.

(56) References Cited

U.S. PATENT DOCUMENTS

| | | | | |
|---|---|---|---|---|
| 9,721,380 | B2* | 8/2017 | Schoenberg | G06T 15/40 |
| 10,521,520 | B2* | 12/2019 | Kaplan | A63F 13/50 |
| 2014/0228115 | A1* | 8/2014 | Kaplan | G06F 30/20 |
| | | | | 463/31 |
| 2015/0279085 | A1* | 10/2015 | Dell | G06T 15/10 |
| | | | | 345/419 |
| 2015/0294500 | A1* | 10/2015 | Tucker | G06T 17/005 |
| | | | | 700/160 |
| 2020/0143586 | A1* | 5/2020 | Kaplan | A63F 13/573 |

* cited by examiner

*Primary Examiner* — Vijay Shankar
(74) *Attorney, Agent, or Firm* — Cynthia S. Lamon; Lamon Patent Services

(57) ABSTRACT

A system for simulating objects in a three dimensional virtual space, comprising a host computing node coupled to a network, padding spheres defined in the virtual space, one padding sphere fully encasing each cube in an octree; a plurality of objects, each object tracked for position in the virtual space. A visibility sphere associated with each object is provided, and at least one display, displaying objects in the virtual space. One of the objects becoming a target object, a search determines objects to be rendered in the display, identifying all padding spheres overlapped at least partially by the visibility sphere of the target object as candidate padding spheres, and identifying objects within or overlapping the candidate padding spheres, determining a visibility ratio for each object of maximum dimension of the object divided by distance from the target object, any object having a visibility to be rendered in the display.

12 Claims, 11 Drawing Sheets

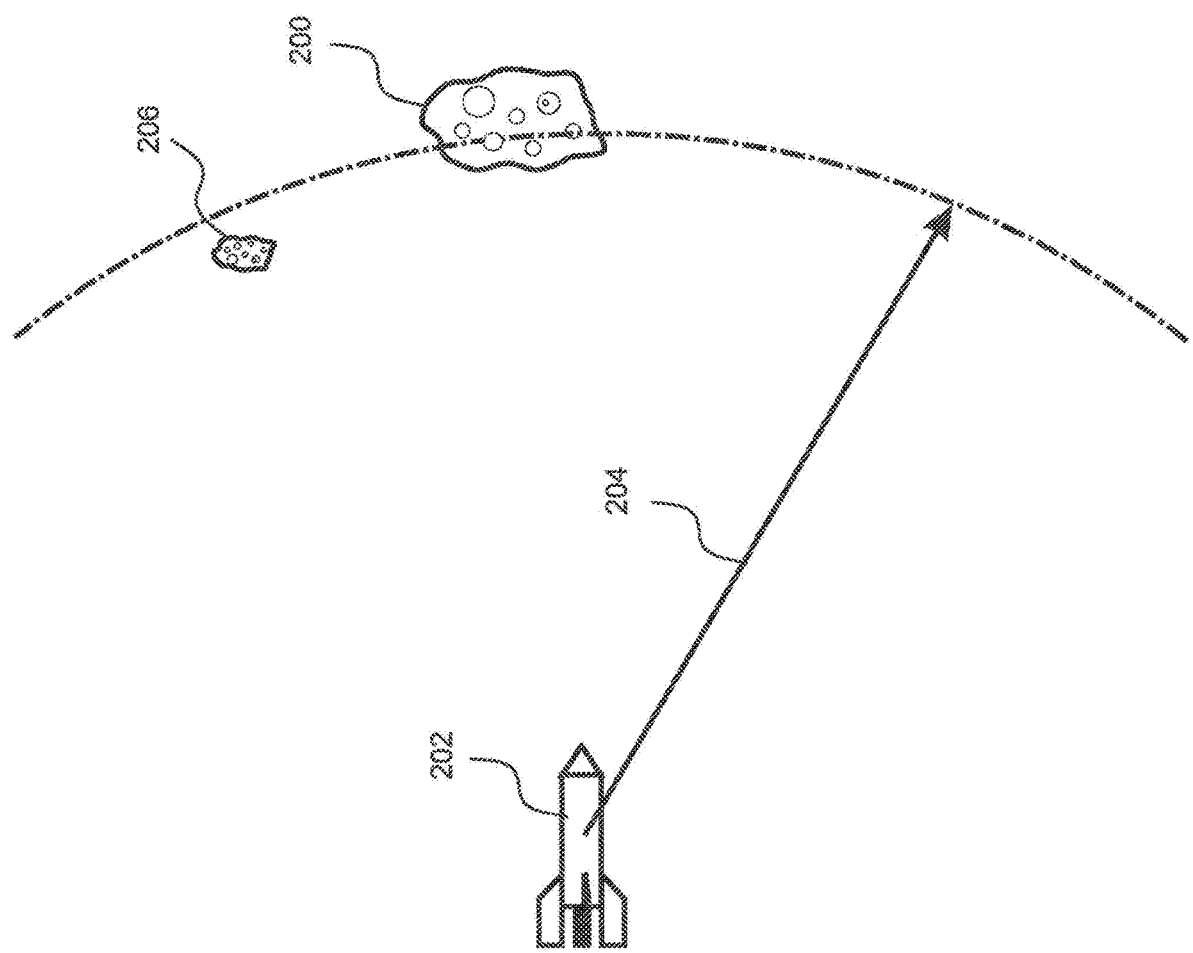

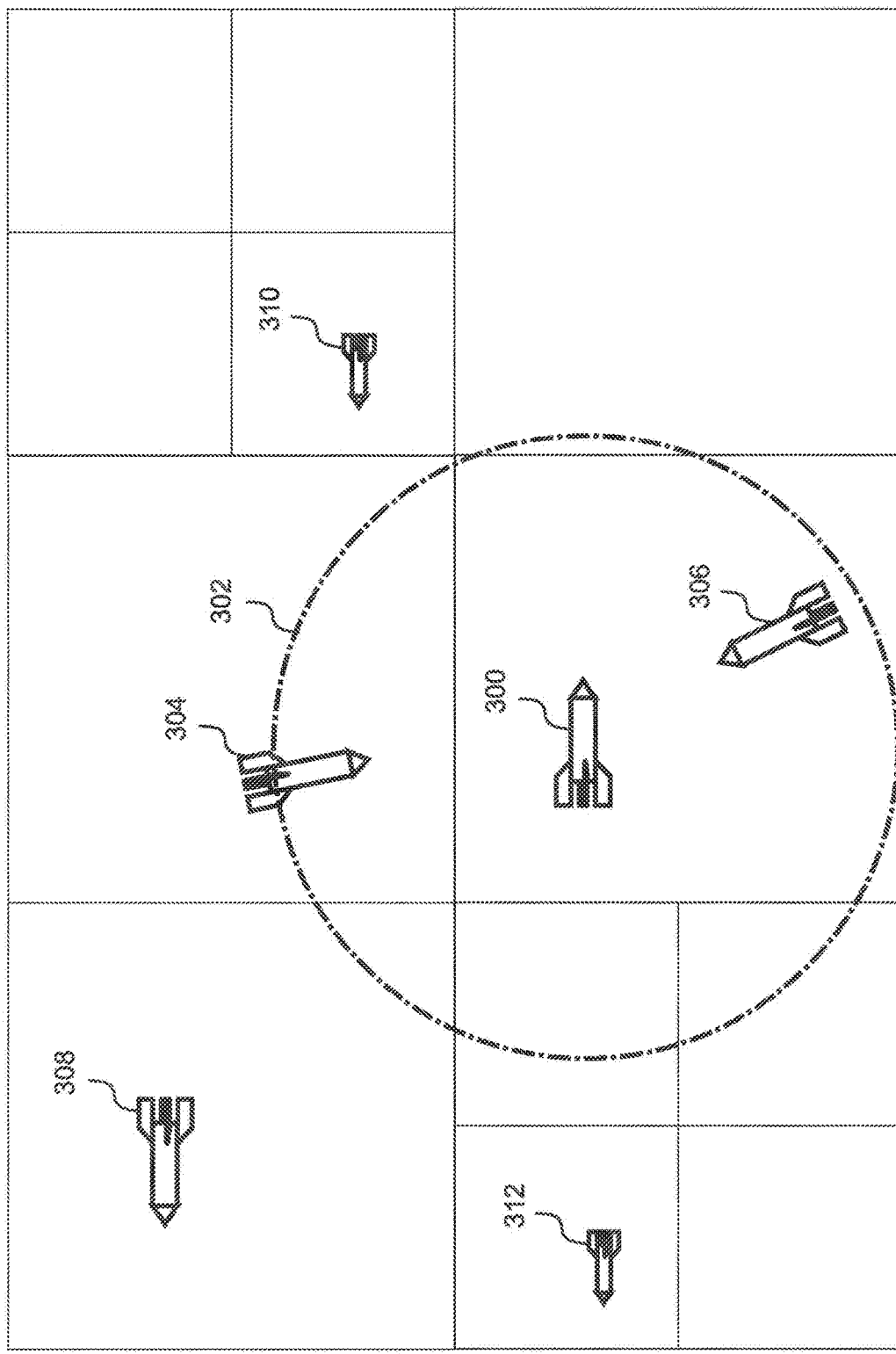

HIGHLY SCALABLE CLUSTER ENGINE FOR HOSTING SIMULATIONS OF OBJECTS INTERACTING WITHIN A SPACE

RELATED APPLICATIONS

This application claims the benefit of U.S. Provisional Application No. 61/764,673, filed Feb. 14, 2013, which is herein incorporated by reference in its entirety for all purposes.

FIELD OF THE INVENTION

The invention relates to computer simulations, and more particularly, to cluster engines that host multi-player games or other simulations of objects interacting in a space.

BACKGROUND OF THE INVENTION

Simulation of objects interacting in a space has become a vital tool for many areas of engineering and scientific investigation, as well as for single and multi-player game simulations. Scientists for example can use computer simulations to calculate and predict the motions and interactions of asteroids, comets, and other planetary bodies. Other scientific applications include such diverse areas as plasma physics, suspension flows, vortex simulations, porous media, and materials science.

In addition, simulation of objects interacting in space lies at the heart of many computer-enabled games, including so-called "Massively Multi-player Online Games" or "MMOG's."

As scientists and engineers seek to analyze ever more complex problems, and as more and more gamers wish to participate simultaneously in MMOG's, many of these technical and gaming applications face the problem of how to provide larger and larger simulations, while maintaining the simulation speed (in some cases real-time) and also minimizing the cost of the engine. Also, there is frequently a problem of scalability. At some point after a given system has been designed and implemented, it is not uncommon for users to wish to expand the capabilities of the system, so as to accommodate more objects and users, and/or more complex simulations, than were originally anticipated.

There is also a rising demand, especially in gaming applications, for better and better graphics, and also for options to participate using devices other than conventional personal computers, for example by using a tablet, a smart phone, or some other hand-held device with limited processing capacity.

One approach to providing larger and faster simulations is to use a single, high-end, dedicated server with very high speed and capacity. However, these so-called "super-computers" can be prohibitively expensive, and they can be difficult to scale beyond certain manufacturer-specified limits.

Another approach, used for example in some online environments, is to distribute most or all of the computation among the personal computers that are used by gamers to access the game. However, for this approach the required data traffic between the nodes increases rapidly as the number of nodes increases, effectively setting an upper limit on the number of players that can be accommodated simultaneously. Also, the computing speeds of the player nodes may vary, such that slower nodes may reduce the speed of the simulation and/or introduce latency effects. In addition, this approach excludes access to the MMOG environment using smart phones, tablets, and other web access devices that have relatively low on-board computing power. And also, this type of architecture can consume significant amounts of computing resources on the user computers during a game, which can limit the ability of the user computers to perform other tasks simultaneously, such as rendering graphics in support of the game. Also, users are often separated from each other by large distances, so that the internet latencies resulting from this type of distributed computing can rise to unacceptable levels.

Yet another approach is to use a cluster of smaller computers, such as a "Beowulf" cluster, as the simulation engine. A Beowulf cluster is a cluster of typically identical, commodity-grade computers that are connected into a small local-area network, having libraries and programs installed which allow processing to be shared among them. The result can be a high-performance, parallel computing cluster assembled from inexpensive personal computer hardware.

Of course, for a cluster of commodity-grade computers to serve as a simulation engine, the computing load must be parallelized, so that it can be distributed among the nodes of the cluster. One approach is to assign specific types of tasks to each node. For example, one node might keep track of the identities and descriptive parameters associated with each object in the simulation, another node might keep track of positions and velocities of objects within the cluster, another node might control "artificial intelligence" or "AI" objects that are not under participant control, yet another node might be dedicated to computing the results of interactions between objects in the simulation, and so forth. However, this approach can result in highly unequal loads being placed on the nodes of the cluster, as well as requiring massive intercommunication between the nodes. Also, a system using this approach is not easily scaled.

Another approach is to assign separate regions or sectors of the simulated space to separate nodes, so that each node in the cluster provides a full, or nearly full, simulation of all activity within its assigned sector(s). However, it is not uncommon for the objects in a simulation to be unequally distributed throughout the simulated space, so that nothing is happening in many sectors, while there are other sectors where frantic activity is taking place among many objects (e.g. a space battle). This can lead to a highly unequal workload distribution among the nodes of the cluster. Also, this approach can be difficult to scale, unless the size of the simulated space is also expanded.

Even with very high computing power, it is still important for a simulation engine to adopt an efficient strategy for organizing and managing the simulated space and the simulated objects within the space. One common approach is to divide the simulated space into an "octree," whereby cubes of simulated space are subdivided into groups of eight identical smaller cubes, at least some of which are subdivided into clusters of eight even smaller cubes, and so-forth. This approach is illustrated by FIG. 1, where a large cube 100 of simulated space is divided into eight smaller cubes 102 of equal dimensions. One of these eight cubes is then further divided into eight even smaller cubes 104.

Typically, a cube in the octree is subdivided only when the number of objects in the cube reaches a certain threshold, such as 100 objects in a given cube. For many of these simulations, the objects have finite sizes, and in some cases also specific shapes and orientations. Once the cube is subdivided, objects in the cube will be "dropped" into smaller sub-cubes, and thereby into the next lower level of the tree, only if they do not overlap any sub-cube boundaries.

Objects that would overlap a boundary of a sub-cube are retained at the higher level of the tree.

In addition to sizes and shapes, simulated objects sometimes also have interaction radii, also called interaction spheres. For example, an object may be able to see other objects only if they are located within a specified visibility radius, also called a visibility "sphere." FIG. 2 presents an example in two dimensions where a simulated asteroid 200 becomes visible to a simulated spaceship 202 only when it crosses within the visibility sphere 204 of the spaceship 202. This approach can be computationally efficient, but it can be problematic to realistically represent the visibility of objects of different sizes. For example, the large asteroid 200 in FIG. 2 may reasonably be visible to the spaceship 202 when it is at the visibility radius 204, however it may not be realistic to also make the much smaller asteroid 206 visible to the spaceship 202 even at a somewhat closer distance. Note that in many implementations, the interaction spheres are actually rectangular or cubical in shape.

An important task for a simulation engine is to determine in real time for each simulated object whether there are any other simulated objects located near enough to be visible or otherwise to trigger an interaction of some kind with that object. One approach is to review the locations of all of the objects to determine which if any of the objects is located within an interaction sphere of another object. However, for this approach the number of inter-object distance calculations that must be performed rises as the square of the number of objects. Hence, this approach can be impractical when simulating the interactions of a large number of objects A more efficient approach for large numbers of simulated objects is to divide the task into at least two steps, as illustrated in FIG. 3. For each object 300 in the simulation, the first step is to determine which cubes in the octree are overlapped by the interaction sphere 302 for that object. Then in subsequent steps it is only necessary to consider the distances between the selected object 300 and whatever objects 304, 306 are located in the overlapped cubes.

For example, in the two-dimensional illustration of FIG. 3, which shows a rectangular portion of a larger space, the interaction sphere 302 for object 300 overlaps six squares, including the square inhabited by the selected object 300. Accordingly, objects 304, 306, 308 which are located in overlapped cubes need to be considered in more detail to determine if they are located within the interaction sphere 302 of the selected object 300. Some of them 308 may be "false positives" that are located within an overlapped square but are not located within the interaction sphere 302. Nevertheless, this approach reduces the total number of objects that need to be considered. In this example, objects 310 and 312 are located in non-overlapped spheres (or squares) and need not be considered. The result can be a much lower total number of object comparisons.

However, the step of determining which spheres overlap which cubes can be computationally demanding, and can be difficult to support for very large simulations.

What is needed, therefore, is a highly scalable engine for simulating interactions between objects in a space, where the computing workload is efficiently parallelized, interacting objects are quickly and efficiently identified, and the visibility of objects of different sizes is realistically represented.

SUMMARY OF THE INVENTION

The present invention is a highly scalable cluster computing engine for simulating interactions between objects in a simulated space, where interacting objects are quickly and efficiently identified. In embodiments, the visibility of objects of different sizes is realistically represented.

The workload is parallelized among a cluster of computing nodes by distributing the simulated objects among a plurality of nodes in the cluster, so that each of the nodes performs most or all of the calculations required to support the subset of simulated objects assigned to that node. In embodiments, the objects are assigned to the nodes in approximately equal numbers, so that the computing burdens placed upon the nodes in the cluster are approximately equal. In some embodiments, the data traffic between the nodes is minimized by distributing the objects among the nodes in a manner that assigns frequently interacting objects to the same node.

Because the computational requirements of the cluster are parallelized by assigning a subset of the objects to each node, the present invention is easily scaled simply by adding more nodes, and then re-distributing existing and new objects so that all of the nodes have similar computing burdens.

It should be understood that the present invention is applicable to a variety of computational tasks, including simulations, modeling, and virtualizations, all of which are referred to generically herein as "simulations," unless dictated otherwise by the context.

The simulated space is organized according to a unique octree wherein each of the cubes of the octree is surrounded by a "padding" sphere that encloses the entire cube, as well as some "padded" space outside of the cube. The cluster identifies interacting objects quickly and efficiently. As a first step, the cluster engine determines which of the padding spheres are candidate spheres that meet an interaction criterion. Of course, this approach can result in some false positives that would not have resulted if only cubes that met the interaction criterion were considered. Nevertheless, the added computational burden of considering these additional false positives is more than outweighed by the computational savings in determining only the candidate spheres. For example, if the interaction criterion is an interaction sphere, then all that is needed is to determine overlaps of spheres with spheres (i.e. simple distance calculations), rather than overlaps of spheres with cubes or cubes with cubes.

In some embodiments, the cubes are exactly circumscribed by the padding spheres, so that the vertices of the cube are touched by the padding sphere. In some of these embodiments, when a cube is subdivided, objects are "dropped" into the sub-cubes in a manner similar to the prior art criteria described above. In particular, if an object overlaps a boundary of a sub-cube, it is not allowed to drop into the sub-cube regardless of its size, and may be required instead to remain in a cube that is eight times larger than the sub-cube.

In other embodiments, the radii of the padding spheres extend beyond the cube vertices. In some of these embodiments, the padding spheres extend beyond the cube vertices by an amount equal to the largest object that the cube will accommodate, where the maximum object size for any given node in the tree is less than or equal to the size of the node's padding sphere. For example, in various embodiments an object is allowed to drop into a sub-cube only if it is significantly smaller than the sub-cube, for example one-tenth the size of the sub-cube. However, objects meeting this size requirement are allowed to drop into the sub-cube even if they overlap a boundary of the sub-cube. In such cases the padding sphere corresponding to the sub-cube extends beyond the sub-cube vertices by an amount proportional to the size of the largest object that is permitted to be dropped into the corresponding sub-cube. As a result, none of the objects in the sub-cube can extend beyond the padding sphere, even if some of them extend beyond boundaries of the sub-cube. A search for padding spheres that are overlapped by an interaction sphere therefore cannot fail to locate all of the cubes in which a potentially interacting object might be located.

It will be clear to those of skill in the art that searching method described herein using a novel octree with padding spheres is not limited to cluster servers, but can be implemented in computing systems having almost any architecture, including in a simulation hosted by a single computer.

In addition, it will be clear to those of skill in the art that embodiments of the present invention are not limited to searching for intersections spheres, but can include other types of overlaps and intersections. For example, when forming a ray-tracing representation of a view as seen by a selected object, a visibility line is extended from the object and a search is performed to find all objects in the simulated space that are intersected by the visibility line. Embodiments of the present invention search first for all padded spheres that are intersected by the visibility line, and then only consider objects contained in the corresponding octree cubes to find the intersected objects.

It will also be clear to those of skill in the art that the present invention can be used to simulate a two-dimensional, three-dimensional, or in general an N-dimensional space. Accordingly, unless dictated otherwise by the context, the term "cube" is used generically herein to signify a square, a cube, or in general whatever equal-sided, N-dimensional sub-region is applicable to the dimensionality of the space being simulated. Similarly, unless dictated otherwise by the context, the term "octree" is used herein generically to refer to a 4-tree for a two-dimensional simulated space, an 8-tree (i.e. octree) for a three-dimensional simulated space, and in general a 2N-tree for an N-dimensional simulated space.

One general aspect of the present invention is a system for hosting a simulation of a plurality of simulated objects interacting within a simulated space. The system includes non-transient media containing software configured for operation on a cluster computing engine, the cluster computing engine including a plurality of computing nodes organized into an intercommunicating cluster, the cluster computing engine being in network communication with a plurality of user access devices. The software is configured to assign the simulated objects to the nodes, so that each of the nodes is responsible for parameter storage and computations in support of the simulated objects that are assigned to it, organize the simulated space into an octree of cubes, each of the cubes being contained within a corresponding padding sphere, and identify all objects that interact with a target object assigned to a host node by causing the nodes to carry out steps including:

communicating by the host node to the other "remote" nodes of a position of the target object and an interaction criterion of the target object;

each of the nodes identifying which padding spheres in their octree are candidate spheres, the candidate spheres being those padding spheres that meet the interaction criterion;

each of the nodes considering candidate objects, the candidate objects being all simulated objects that are located in the cubes that correspond with the candidate spheres;

each of the nodes determining which of the candidate objects meet the interaction criterion;

communicating by the remote nodes to the host node of positions and other details regarding all objects that meet the interaction criterion; and the host node simulating interactions between the target object and the objects that meet the interaction criterion.

In embodiments, the software is further configured to enable a simulation implementer to specify an apportionment of computational workload between the cluster engine and the user access devices, the implementer being able to specify that only command transmission and graphics rendering be apportioned to the user access devices.

In some embodiments, the cubes are circumscribed within the corresponding padding spheres, so that the padding spheres intersect with vertices of the corresponding cubes.

In other embodiments, the padding spheres extend beyond the vertices of the corresponding cubes by an amount that is proportional to a largest object size assigned to the cube, whereby objects that are smaller than the largest object size are permitted to be located in the cube, even if they overlap a boundary of the cube, and objects that are larger than the largest object size are not permitted to be located in the cube.

In various embodiments the software is able to redistribute the simulated objects among the nodes so that frequently interacting objects are assigned to the same node.

In certain embodiments the cluster further includes at least one supporting node to which no simulated objects are assigned.

In some embodiments, the interaction criterion specifies that an object or a padding sphere is deemed to interact with the target object if an only if it intersects with or is contained within an interaction sphere corresponding to the target object, the interaction sphere having an interaction radius.

In some of these embodiments, the target object is surrounded by a plurality of corresponding interaction spheres, each of the interaction spheres representing a different type of interaction, and wherein identifying interactions between the simulated objects includes identifying overlapped padding spheres for the largest of the interaction spheres and determining which candidate objects are located at least partly within the cubes that correspond with the overlapped padding spheres.

In other of these embodiments, the interaction radius of the interaction sphere is scaled by a coefficient that is dependent on a size and distance of a candidate object, so that a candidate object having a candidate size and separated from the target object by a candidate distance is within the target interaction sphere only if the coefficient for the candidate object meets a specified scaled interaction criterion.

And in yet other of these embodiments the interaction sphere is a visibility sphere that indicates a distance within which candidate objects are visible to the target object.

In certain embodiments, the software is further configured to maintain a copy of the octree in each node, subdivision of the cubes in each octree being according to numbers and locations of objects assigned to the corresponding node.

And in various embodiments the simulated objects are assigned to the nodes in approximately equal numbers.

Another general aspect of the present invention is a system for hosting a simulation of a plurality of simulated objects interacting within a simulated space, the system comprising non-transient media containing software configured for operation on a computing system, the computing system being in network communication with a plurality of user access devices. The software is configured to organize the simulated space into an octree of cubes, each of the cubes being contained within a corresponding padding sphere, and identify all objects that interact with a target object assigned to a host node by carrying out steps including:

identifying which padding spheres in the octree are candidate spheres, the candidate spheres being those padding spheres that meet the interaction criterion; considering candidate objects, the candidate objects being all of the simulated objects that are located in the cubes that correspond with the candidate spheres;

determining which of the candidate objects meet the interaction criterion; and simulating interactions between the target object and the objects that meet the interaction criterion.

In embodiments, the software is further configured to enable a simulation implementer to specify an apportionment of computational workload between the computing system and the user access devices, the implementer being able to specify that only command transmission and graphics rendering be apportioned to the user access devices.

In various embodiments, the cubes are circumscribed within the corresponding padding spheres, so that the padding spheres intersect with vertices of the corresponding cubes.

In some embodiments the padding spheres extend beyond the vertices of the corresponding cubes by an amount that is proportional to a largest object size assigned to the cube, whereby objects that are smaller than the largest object size are permitted to be located in the cube, even if they overlap a boundary of the cube, and objects that are larger than the largest object size are not permitted to be located in the cube.

In some embodiments, the interaction criterion specifies that an object or a padding sphere is deemed to interact with the target object if an only if it intersects with or is contained within an interaction sphere corresponding to the target object, the interaction sphere having an interaction radius.

In some of these embodiments the target object is surrounded by a plurality of corresponding interaction spheres, each of the interaction spheres representing a different type of interaction, and wherein identifying interactions between the simulated objects includes identifying overlapped padding spheres for the largest of the interaction spheres and determining which candidate objects are located at least partly within the cubes that correspond with the overlapped padding spheres.

In other of these embodiment the interaction radius of the target object is scaled by a coefficient that is dependent on a size and distance of a candidate object, so that a candidate object having a candidate size and separated from the target object by a candidate distance is within the target interaction sphere only if the coefficient for the candidate object meets a specified criterion.

And in still other of these embodiments the interaction sphere is a visibility sphere that indicates a distance within which candidate objects are visible to the target object.

The features and advantages described herein are not all-inclusive and, in particular, many additional features and advantages will be apparent to one of ordinary skill in the art in view of the drawings, specification, and claims.

Moreover, it should be noted that the language used in the specification has been principally selected for readability and instructional purposes, and not to limit the scope of the inventive subject matter.

BRIEF DESCRIPTION OF THE DRAWINGS

FIG. 2 is a two dimensional illustration of two simulated objects located within or on the visibility sphere of a simulated spacecraft, as is known in the prior art;

FIG. 3 is a two-dimensional illustration showing how some prior art systems determine which cubes in an octree are overlapped by an interaction sphere;

DETAILED DESCRIPTION

The present invention is a highly scalable engine for simulating interactions between objects in a space, where the computing workload is efficiently parallelized, and interacting objects are quickly and efficiently identified. The workload is parallelized by distributing the simulated objects among a plurality of nodes in the cluster, so that each of the nodes performs most or all of the calculations required to support the subset of simulated objects assigned to that node. In some embodiments, all of the nodes participate in supporting the objects, while in other embodiments at least one node is reserved for other tasks. For example, certain embodiments include "gateway" nodes through which users gain access to the cluster. Except where otherwise indicated, expressions such as "the nodes" and "all of the nodes" as used herein refer to the nodes which participate in supporting objects.

In embodiments, the objects are assigned to the nodes in approximately equal numbers, so that the computing burdens placed upon the nodes in the cluster are approximately equal. In some embodiments, the assignments are at least initially random. In various embodiments, data traffic between the nodes is minimized by distributing the objects among the nodes in a manner that assigns frequently interacting objects to the same node.

Because the computational requirements in the present invention are parallelized by assigning the objects to nodes, and because the system is able to freely re-distribute the objects among the nodes, the present invention is easily scaled, simply by adding more nodes to the cluster and then re-distributing the existing objects and any new objects so that all of the nodes carry similar computing burdens.

It should be understood that the present invention is applicable to a variety of computational tasks, including simulations, modeling, and virtualizations, all of which are referred to generically herein as "simulations," unless dictated otherwise by the context.

The cluster engine of the present invention identifies interacting objects quickly and efficiently by initially determining only interactions with spheres, which is much less demanding computationally than determining interactions with cubes. The cluster engine of the present invention organizes the simulated space according to a unique octree of padded cubes, wherein each of the cubes in an otherwise conventional octree is surrounded by a "padding" sphere that encloses the entire cube, and in embodiments also encloses some "padded" space outside of the cube. In embodiments, each node maintains its own octree, and determines which cubes in the octree to subdivide and which objects to drop into the sub-cubes according to the locations, sizes, and numbers of objects hosted by that node that are contained within each cube.

Figure 1:
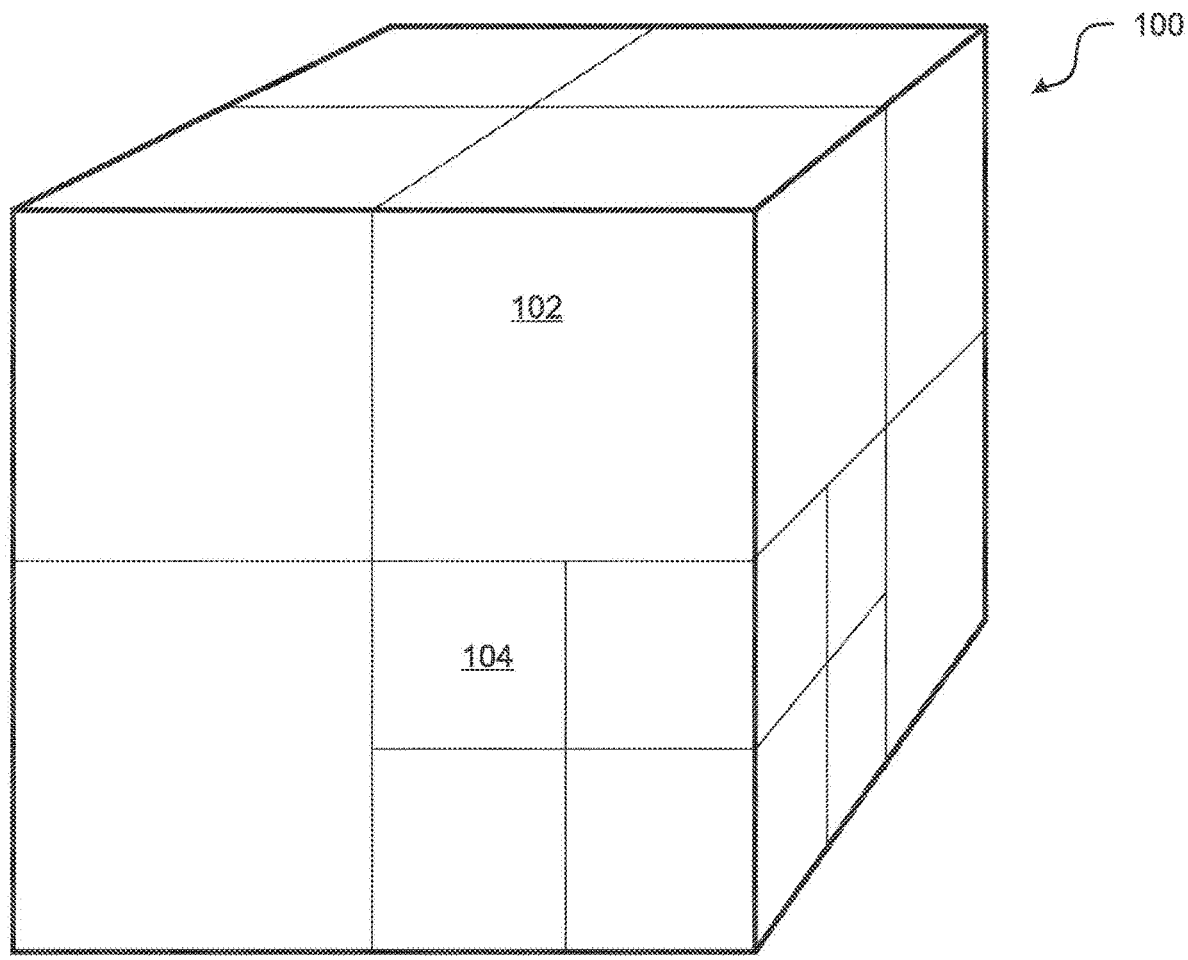
FIG. 1 is a three-dimensional illustration of an octree, as used in the prior art.
Figure 4A:
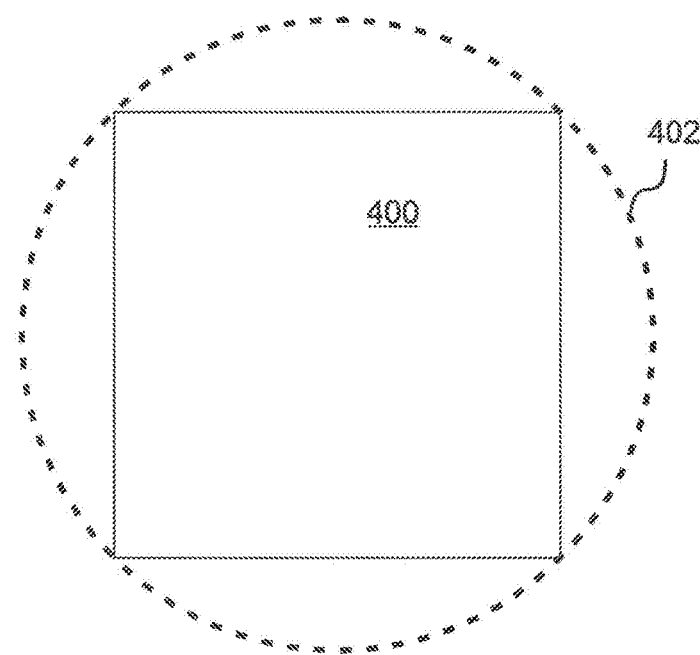
FIG. 4A is a two-dimensional illustration of a cube of an octree circumscribed by a corresponding padding sphere, according to embodiments of the present invention.
Figure 4B:
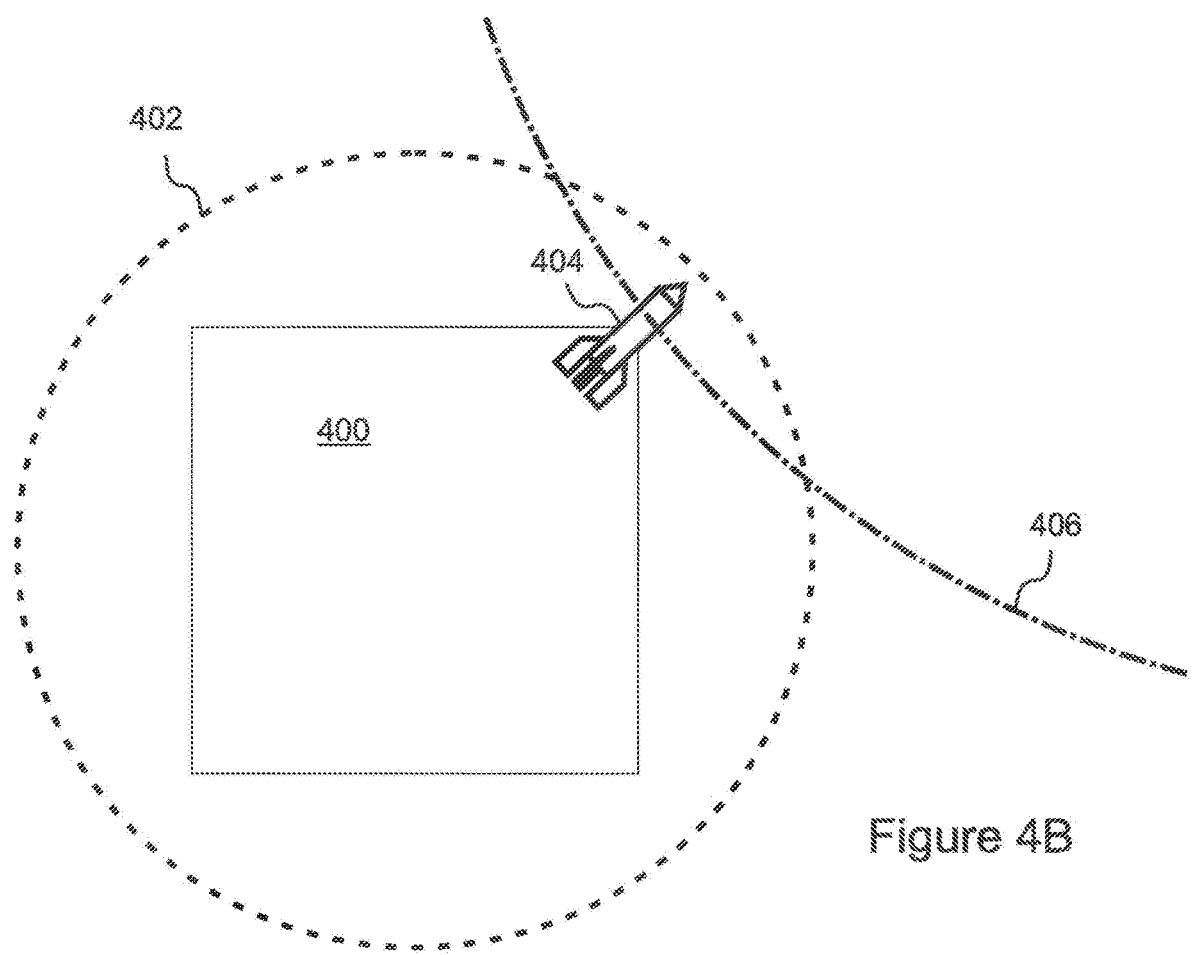
FIG. 4B is a two-dimensional illustration similar to FIG. 4A, except that the padding sphere extends beyond the vertices of the cube, so that an object at the vertex will not extend beyond the sphere.

A 2-dimensional example of a single padded square is presented in FIG. 4A. In this example, the square 400 is exactly circumscribed by its padding circle 402. With reference to FIG. 4B, in some embodiments the padding spheres 402 extend beyond the vertices of the corresponding cubes 400 in proportion to the size of the largest object 404 that is allowed to drop into that cube, so that even if an object 404 is located at a vertex of the cube, it will not extend beyond the padding sphere 402. If the interaction sphere 406 of another object overlaps the object 404 but not the cube 400, the object will not be overlooked, because the initial search will look for padding spheres 402 that are overlapped by the interaction sphere 406, not for cubes 400 that are overlapped by the interaction sphere 406. While the interaction sphere 406 is represented in FIG. 4B as being spherical in shape, note that in many implementations the interaction spheres are actually rectangular or cubical in shape.

Figure 5:
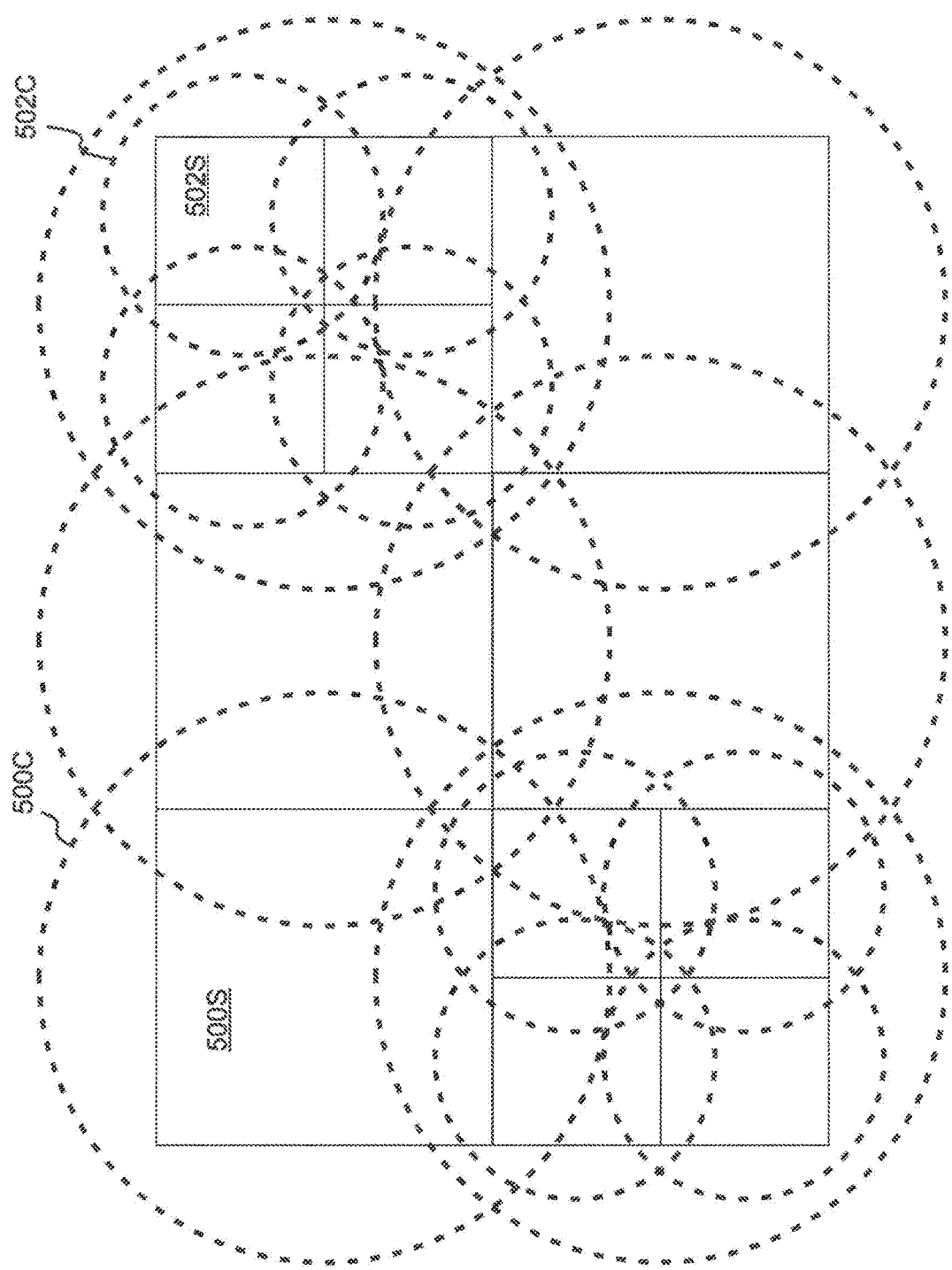
FIG. 5 is a two-dimensional illustration of a plurality of cubes in an octree surrounded by corresponding padding spheres.

FIG. 5 presents a 2-dimensional example of a plurality of padded squares in an embodiment of the present invention. It is clear that the padding spheres 500C, 502C (circles in this 2-dimensional example) extend into adjacent cubes, and that padding spheres 502C for smaller sub-cubes 502S are contained within padding spheres for larger cubes.

Figure 6A:
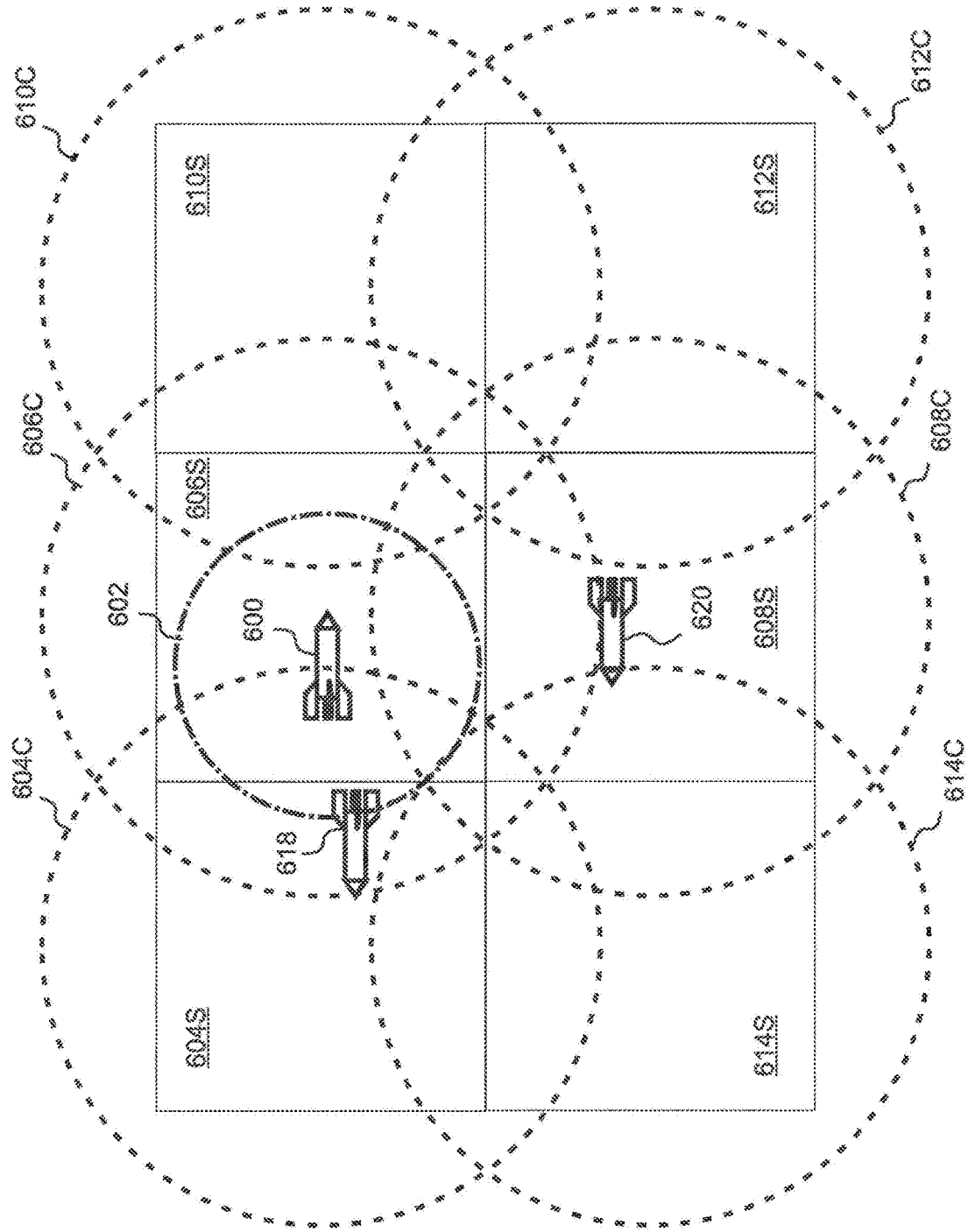
FIG. 6A is a two-dimensional illustration showing how embodiments of the present invention determine which padding spheres in an octree are overlapped by an interaction sphere.

As a first step in identifying object interactions, the host node for a target object reports the location and an interaction criterion, such as an interaction radius of the target object, to the other nodes in the cluster engine. Then all of the nodes, including both the host node and the other nodes, proceed to consult their locally stored octrees to determine which of the padding spheres are candidate spheres that meet the interaction criterion. FIG. 6A presents a 2-dimensional example in which the interaction criterion for a target object 600 is an interaction sphere 602 that surrounds the target object 600. The interaction sphere 602 overlaps the padding circle 606C corresponding to the square 606S in which the selected object 600 resides, as well as two adjacent padding circles 604C, 608C. Accordingly, it is necessary to consider in detail the objects contained in all of the squares 604S, 606S, 608S corresponding to the overlapped padding circles 604C, 606C, and 608C. The object in square 604S is within interaction range of the selected object 600, while the object in square 608S is a "false positive."

Of course, this approach can result in some false positives that would not have resulted if only overlapped cubes were considered. For example, the object in square 608S would not have been examined if only overlapped squares were considered, because the interaction sphere 602 does not overlap square 608S, but only overlaps padded space within padding circle 608C. Nevertheless, the added computational burden of considering these additional false positives is more than outweighed by the computational savings in determining only the overlaps of spheres with spheres (i.e. simple distance calculations), rather than overlaps of spheres with cubes or cubes with cubes.

In general, objects can have more than one interaction sphere, corresponding to more than one type of interaction. In such cases, the overlaps of each interaction sphere with the padding spheres must be determined. For example, a simulated spaceship may have a short range visibility sphere that applies to objects below a certain size, and a long range visibility sphere that applies to objects of a larger size. In such cases, only larger cubes that are overlapped by the long range visibility sphere need be considered.

In some embodiments, a "scaled" visibility sphere can be defined, whereby an object is deemed to be visible to the target object only if it meets a computational requirement dependent on the distance and the size of the object, for example if the ratio of the object's size divided by its distance from the target object is greater than a specified scaling value. A plurality of criteria can be provided that correspond to different visibility levels of detail, so that for example a smaller object may only meet the criteria for being visible as a point, while a larger object at the same distance may meet the criteria for being visible as a shaped object.

Figure 6B:
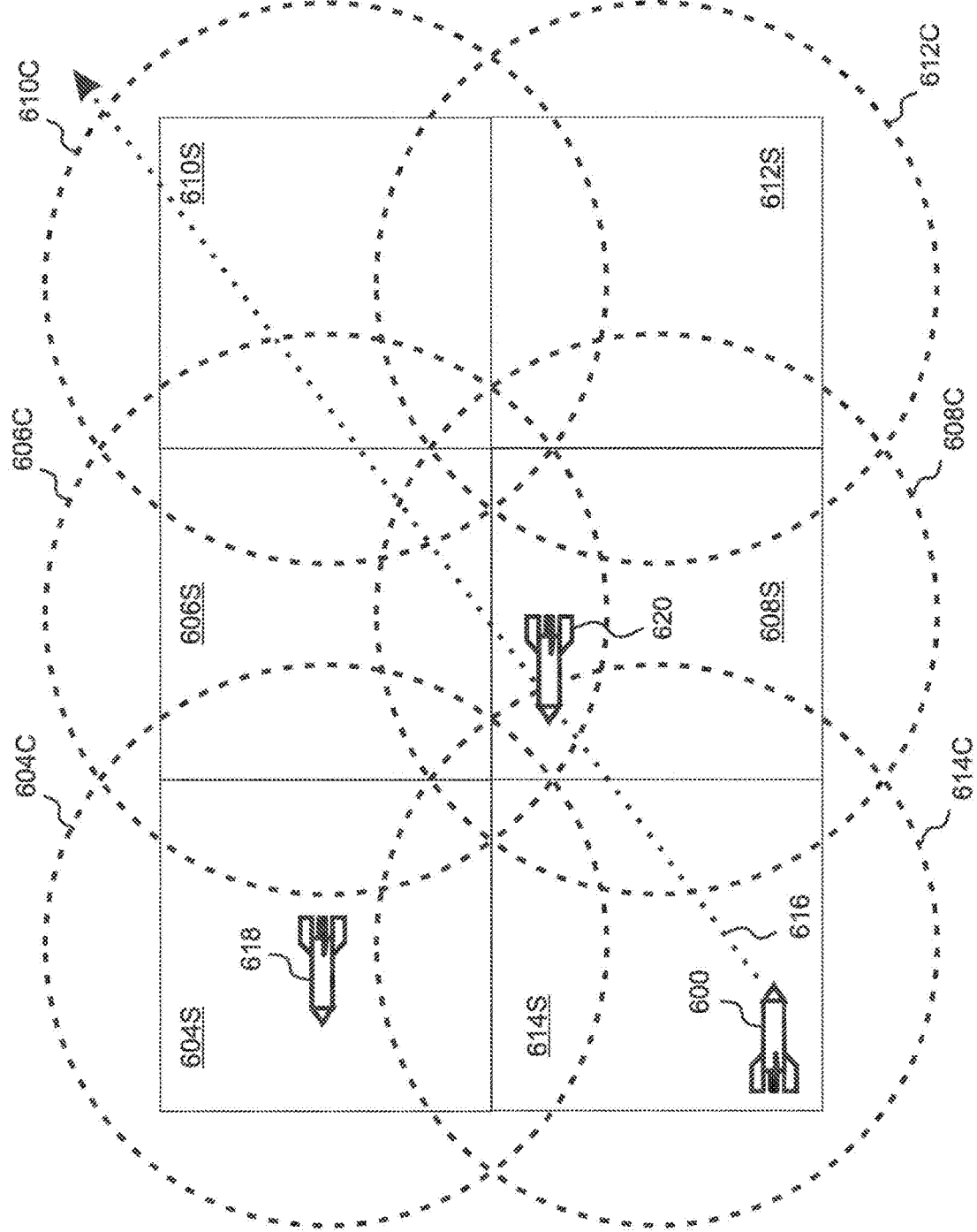
FIG. 6B is a two-dimensional illustration showing how embodiments of the present invention determine which padding spheres in an octree are intersected by a ray-tracing visibility path.

With reference to FIG. 6B, embodiments of the present invention are not limited to searching for intersections between an interaction sphere and padded spheres, but can include other types of overlaps and intersections. For example, in the embodiment of FIG. 6B, when forming a ray-tracing representation of a view as seen by a selected object 600, a visibility line 616 is extended from the object 600 and a search is performed to find all objects in the simulated space that are intersected by the visibility line 616. In the 2D example illustrated in FIG. 6B, the visibility line 616 intersects four padded circles 606C, 608C, 610C, 614C, while at least two other padded circles 604C, 612C are not intersected. Accordingly, only the objects contained in the four squares 606S, 608S, 610S, 614S that correspond to the four intersected padded circles 606C, 608C, 610C, 614C need to be considered. In the example of FIG. 6B, the only such object is item 620 in square 608S. Objects contained in squares corresponding to padded circles that are not intersected by the visibility line 616 are not considered in the search. In the example of FIG. 6B, the only such object is item 618 in square 604S.

Figure 7:
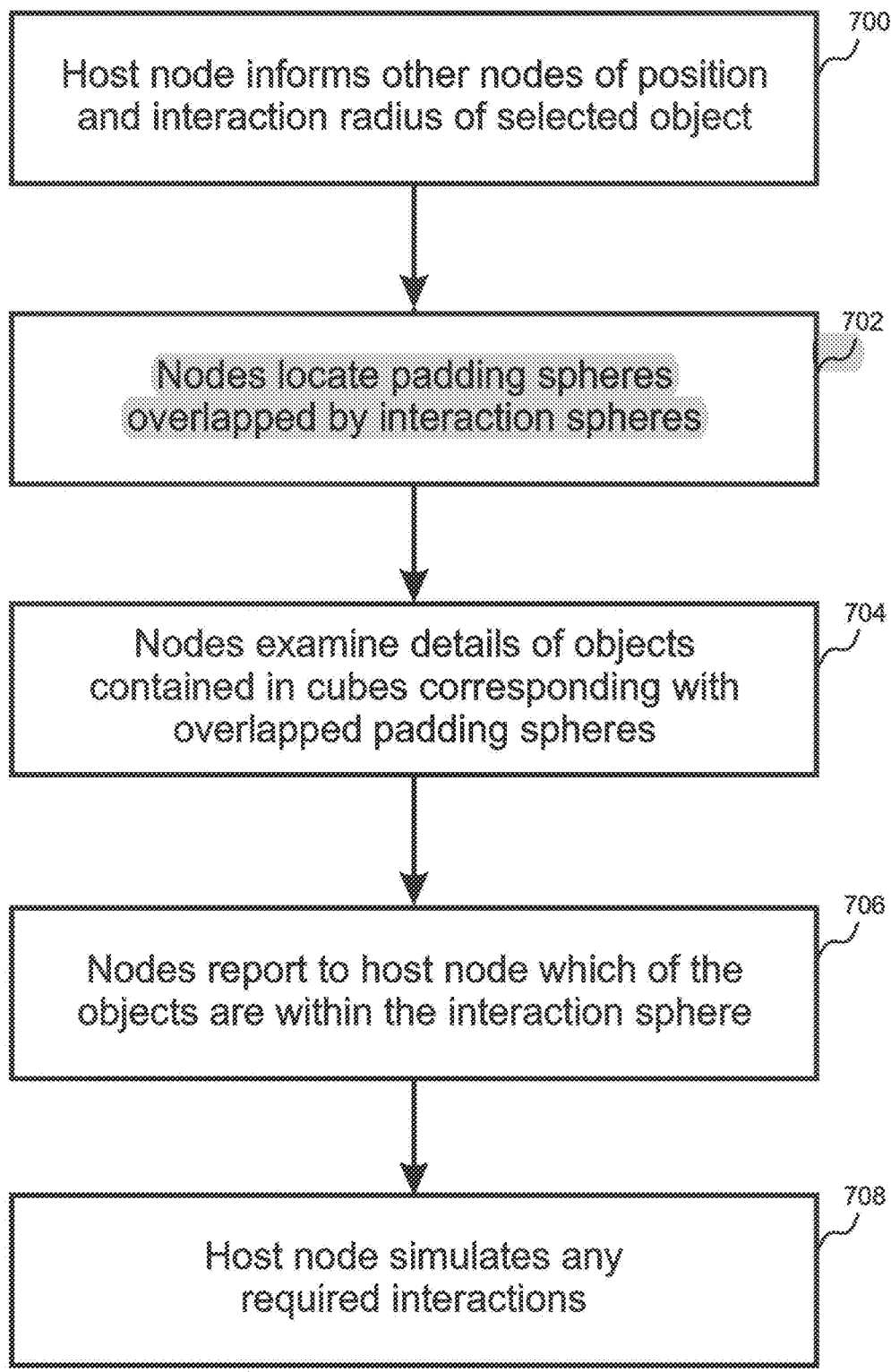
FIG. 7 is a flow diagram illustrating steps followed by embodiments of the present invention to determine which objects in a simulation are interacting with each other.

With reference to FIG. 7, a search for objects that might interact with a target object controlled by a host node begins with the host node informing the remote nodes, which are all of the other nodes, of the position and interaction radius of the target object 700. Typically, the search is initiated by movement or by some other change of the target object. All of the nodes, including the host node and the remote nodes, then consult their locally stored octrees, and determine which padding spheres are overlapped by the interaction sphere of the target object 702. The nodes then consider the objects and/or sub-cubes (thus traversing down the tree) located within the overlapped padding spheres, and determine which objects are within the interaction radius 704. The remote nodes then report back to the host node the locations and other details of all of their objects that are within the interaction sphere of the target object 706. If necessary, the host node then performs the calculations 708 necessary to simulate the indicated interaction(s). If the interaction affects other objects, their host nodes also perform similar calculations.

Object searches can be initiated by any of several criteria, including movement of the target object and/or in some embodiments also other actions or "emotes" performed by the target object. In various embodiments, a search can be initiated based on a target location in the simulated space, even if no object currently occupies that location.

It will be clear to those of skill in the art that searching method described herein using a novel octree with padding spheres is not limited to cluster servers, but can be implemented in computing systems having almost any architecture, including in a simulation hosted by a single computer.

It will also be clear to those of skill in the art that the present invention can be used to simulate a two-dimensional, three-dimensional, or in general an N-dimensional space. Accordingly, unless dictated otherwise by the context, the term "cube" is used generically herein to signify a square, a cube, or in general whatever equal-sided, N-dimensional sub-region is applicable to the dimensionality of the space being simulated. Similarly, unless dictated otherwise by the context, the term "octree" is used herein generically to refer to a 4-tree for a two-dimensional simulated space, an 8-tree (i.e. octree) for a three-dimensional simulated space, and in general a 2N-tree for an N-dimensional simulated space.

Object Visibility and Discovery

One problem mentioned in the background section is that current art visibility searches are typically done using what is known as a "far-plane". Far plane is a distance beyond which no objects may be considered visible in simulation. The further away the far-plane is from the camera, more objects will be revealed in the search results.

Referring now to FIG. 6A, object visibility is critical to understanding whether or not one or more object interactions must be simulated. In FIG. 6A, visibility is considered simply by determining position of the objects relative to padding spheres, which generates some false positive results but is more efficient than computing using cube padding. Referring now to FIG. 6B, a visibility ray is defined and objects contained in cubes where padding circles are intersected by the visibility ray are considered.

In one embodiment of the current invention, a scaled visibility search may be implemented using padding spheres and octrees. In this embodiment, objects up to an infinite distance are discovered with the aid of a scalar threshold. In one embodiment of the present invention, a search for objects is performed when a scalar ratio is defined, and the octree is searched for objects at least as large as the scalar ratio, which will be considered "visible." In another embodiment of the current invention, a search for objects is performed by calculating the visibility of the "closest visible point" in the object's cell (broad phase algorithm), and if the cell is visible, check if the object is visible (narrow phase algorithm) In one embodiment, one search occurs down the tree. First, a check of a cell (cube) occurs, if it passes, you check any objects that it contains and all of its child cells, if it has any. Checking an object is easy: just see if the radius/distance meets or exceeds the given threshold. Checking a cell is a bit trickier. It is explained elsewhere in this specification, as well. A cell is presented, the location of the viewer, and a scalar threshold. All objects in the cell are ruled out by seeing if the largest and closest (to the viewer) possible object that is still entirely within the bounds of the padding sphere would not be "visible". If that imaginary object wouldn't be visible to the viewer (scalar ratio doesn't meet the threshold), then no object in that cell could possibly be visible. If it passes, the objects are checked in the cell and all of its child cells, if they exist. Note: the viewer does not need to be in the tree.

More specifically, the location that the closest object could possibly be and still remain within the bounds of the padding sphere (including its radius) is determined. So the closest possible object to the target object would lie on the line between the cube's center and the target object, and the position of this closest possible object would be set back from the edge of the padding sphere so the edge of the object's bounding sphere lies precisely at the edge of the padding sphere (this is simple math so it is fast). Because the method doesn't use an actual object in the tree (it is a potential tree object), we use the padding size as the tree object's radius (i.e. the largest tree object that could be in that cube). This gives the location and size of the closest possible tree object to the target object that could possibly be within that cube, and then some due to the inefficiency mentioned above. Next, a visibility test is done on that idealized tree object: given its "size" and the distance between it and the target object, the method divides the size by the distance and see if the idealized tree object meets the threshold for visibility. Like with collision, if it fails the test, further processing down that branch of the tree is avoided. The word "size" is in quotes because with visibility, it isn't necessarily the physical size of an object (like it is with collision). It could be the same, but it can also contrive an artificial sense of visibility by making a given object less or more visible than its physical size would imply (e.g. if it is emitting light, then it should be visible from further away than if it wasn't emitting light).

Optionally, if the visibility size to the physical size (i.e. they are always equal for all objects) is fixed, then the collision tests are done and the visibility tests are done on the same tree. If we want visibility to be independent of physical size, then we need to use two separate trees.

Lighting Search [Object Visibility]

Figure 8:
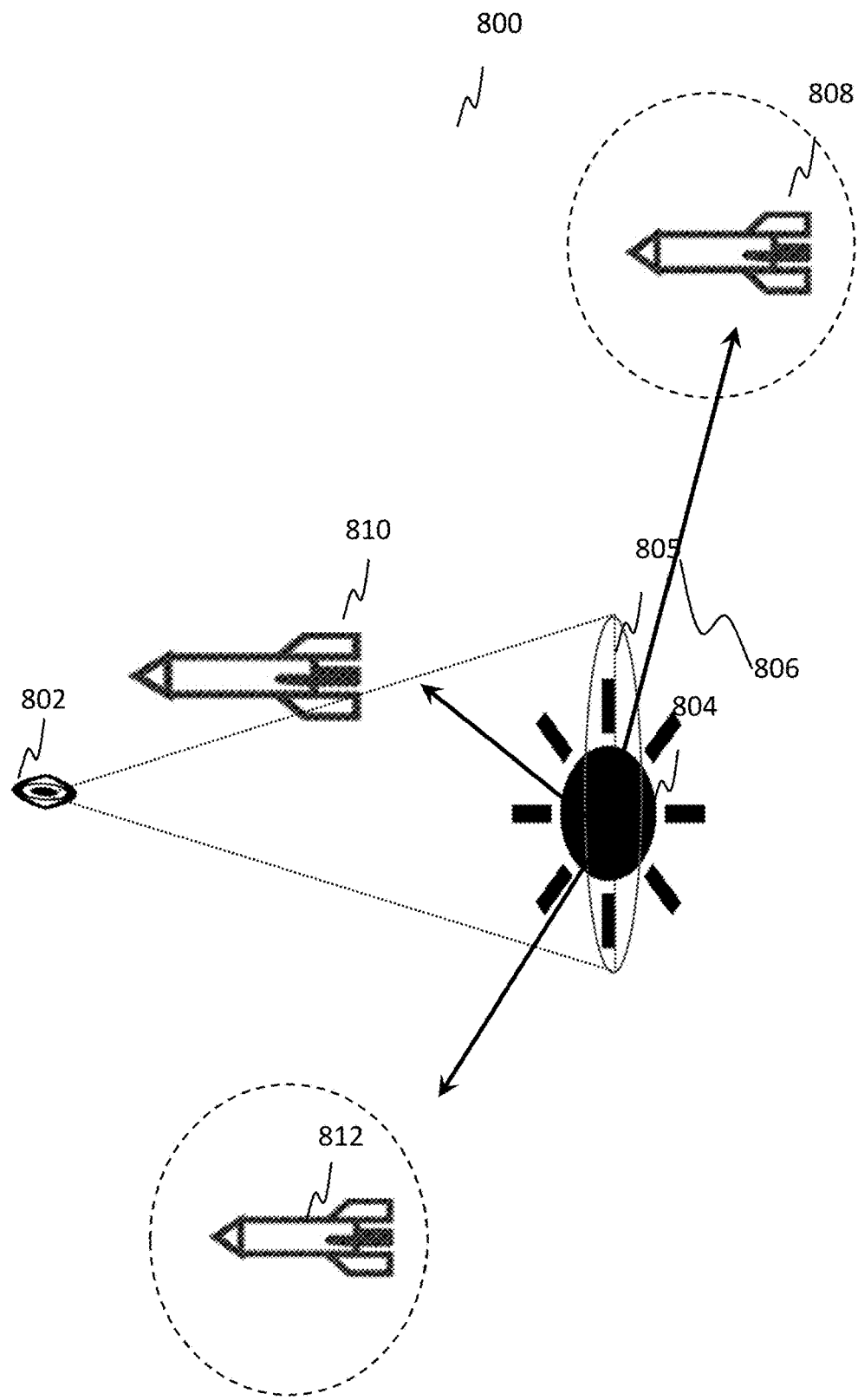
FIG. 8 is a block diagram depicting a lighting search to determine visible objects.

Referring now to FIG. 8, a simulation 800 includes three objects, an object 808, an object 810, and an object 812. In one embodiment, a lighting search may be performed using padded spheres and octrees and a lighting source. A point light source 804 is depicted with a radial boundary. Objects 808, 810, and 812 are checked for scaled visibility from the point of light source 804 using a scaled radius (806) for each object. In this visibility search, any objects that are considered visible are also considered possibly illuminated by the point light source.

In this implementation there are two processes for determining visibility for interaction, the second one is referred to herein as a viewpoint cone search. In this process the apex of a visibility cone 805 culminates at the vantage point 802 of the viewer (user). A cone search enables discovery of objects that may intersect the cone. The cone space is defined as a cone apex representing the visual vantage point of a user wherein the center base of the cone contains the point of the light source 804 and the light source radius 805. In this implementation, a search using interaction spheres discovers object 808 but does not discover objects 810 or 812. Object 810 is discovered by adding the cone search making the entire process a two phase process. The overall time to complete such a two phase lighting search of objects is exceedingly faster than typical visibility searches performed in prior art systems. It is noted herein that the cone search is not required in order to practice the invention as the search may be conducted as a single phase search using the padded spheres and the octrees.

The above described process improves performance for lighting calculations especially for any simulation systems having few illumination sources or relative darkness such as simulations of outer space or typically dark space. Results from each of the lighting search phases may be combined as described above to discover objects 808 and 810 while object 812 is too far away.

The lighting search process described above involves several standard Ospace collision tests, but also includes a novel test. In this novel collision test light is considered a point light (fixed) with a radius-based boundary. Such radii may already exist in game engines as an attenuation radius such as in UE4 engines. The novelty is using the component with a light source to discover object visibility for object interaction.

Generally speaking, an object is being illuminated by a given light if that object is detected to have breached that influence sphere of the light source. Addition of the cone search process helps to mitigate objects that are occluding the light source. More particularly, any objects within the cone are occluding the light source and should be considered for potential interaction. In this method objects that are close enough and large enough but remain unlit may be ignored. The light source provides the illumination sphere. Objects found within the lighting sphere or in the cone are replicated.

A lighting search using a scaled visibility search is characterized in that each target object radius is scaled by dividing the object bounding radius by the object distance from the given light source. In some embodiments, a lighting search uses a scaled visibility search where the target object bounding radius is divided by the square of the object distance from the light source. In other embodiments, the lighting search may perform multiple scaled searches to provide multiple layers of lighting information.

Gravity Search [Object Visibility]

In one embodiment of the invention, a gravity search may be performed using padding spheres and octrees. In essence, for each selected or target object, a scaled search may be conducted for all other objects in space that may affect the gravity of the target object. For each object a gravity threshold may be set. This may be accomplished with a broad phase algorithm and the number of objects checked for gravity interaction may be largely reduced making gravity calculations for a large number of objects in a given system feasible.

Figure 9A:
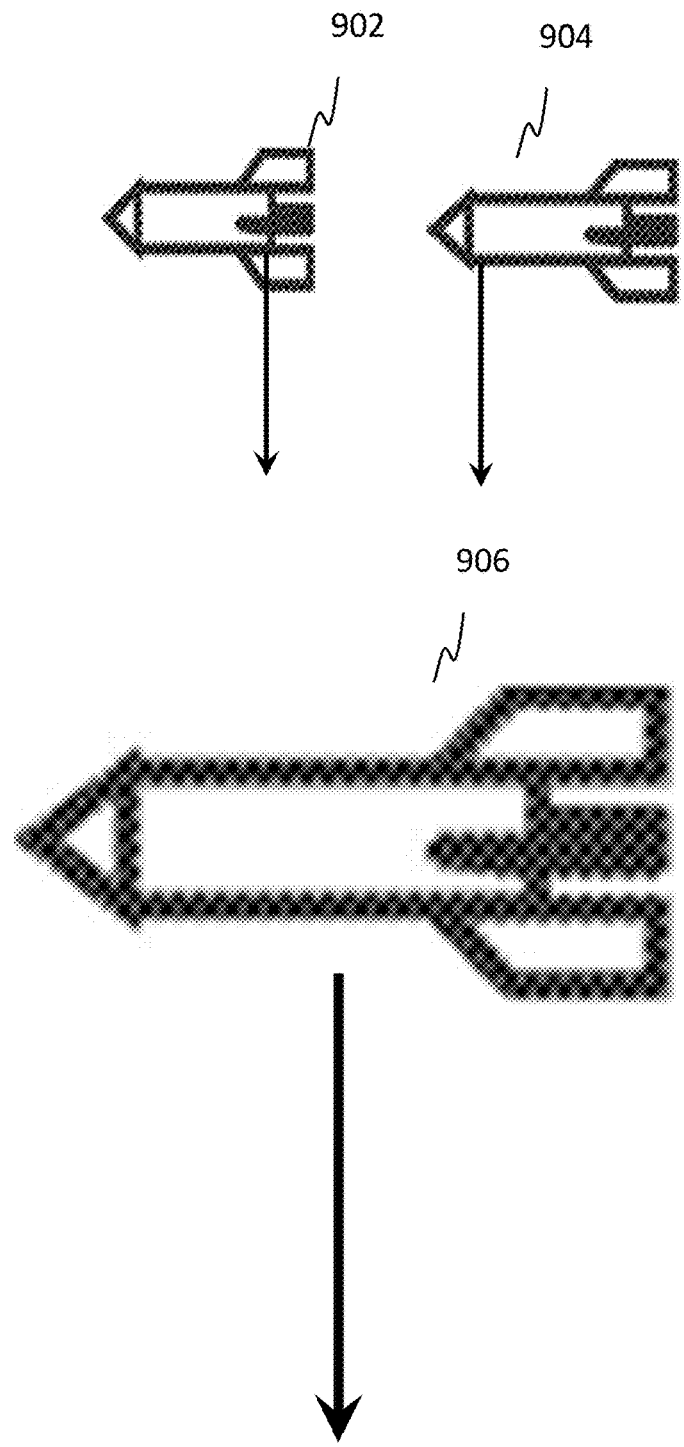
FIG. 9A is a block diagram depicting gravity calculation of objects in a simulated space according to prior art.

Referring now to FIG. 9A, in current art systems with large numbers of objects, gravity is calculated by assuming a large gravitational force is nearby and is pulling all of the objects in a same direction. Therefore all of the objects in FIG. 9A including objects 902, 904, and 906 are pulled in the same direction (direction of arrows) according to each of the objects calculated masses.

Figure 9B:
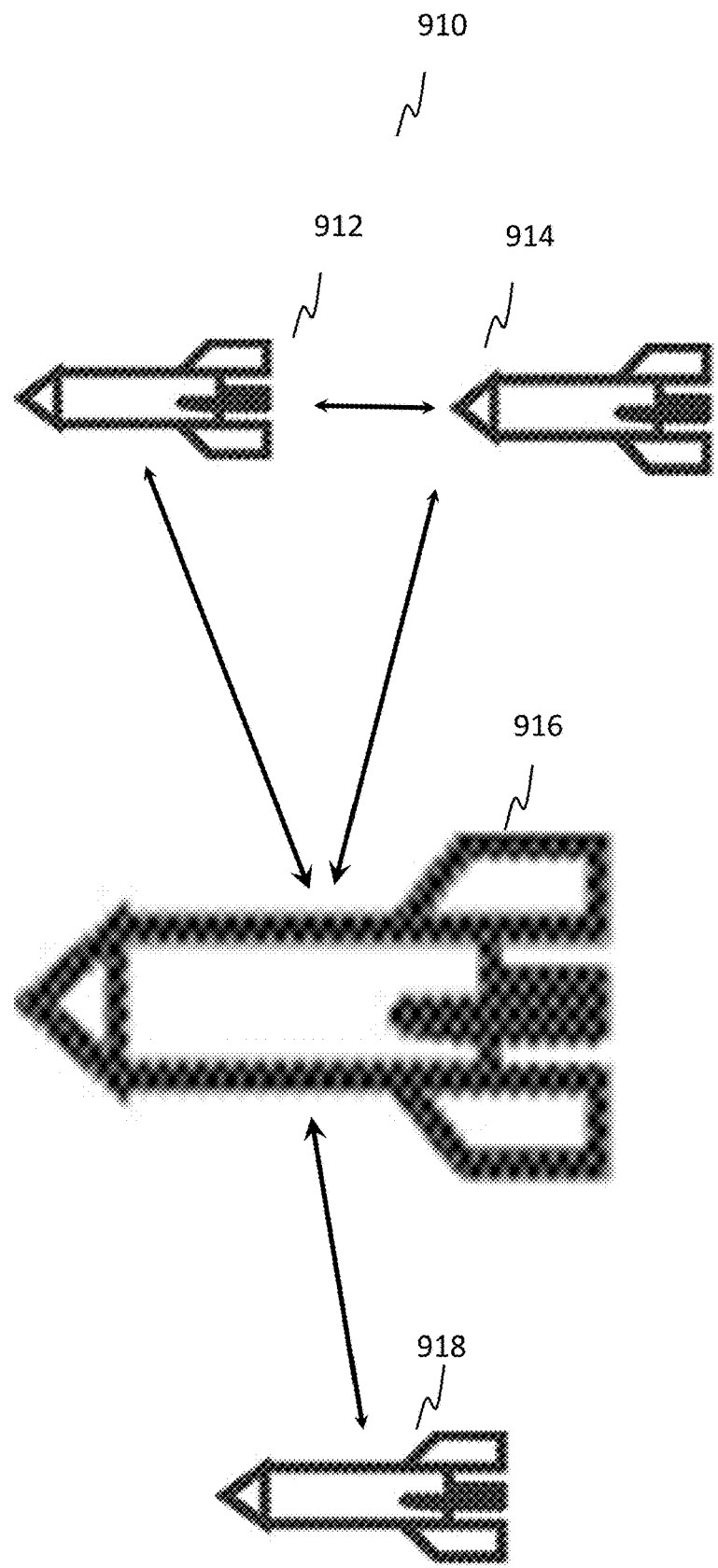
FIG. 9B is a block diagram depicting gravity calculation of objects in a simulated space according to an embodiment of the present invention.

In a preferred embodiment, a gravity search may be performed using spherical padding and octrees. Using traditional (prior art) methods for calculating the gravity of a large number of objects such as depicted in FIG. 9B becomes untraceable rather quickly in the process. However, performing a gravity search as depicted in FIG. 9B may scale up easily with more and more objects.

Referring now to FIG. 9B, a gravity search 910 may be conducted where each object considers gravity of all the other objects. That is to say that each individual object may perform a scaled search similar to the scaled visibility search process referenced in the description of FIG. 8 above. In this embodiment each object reports any significant (above a threshold) gravitational forces affecting it due to nearby objects. In this method, the gravity search returns the calculated gravitational forces acting between object 916 and nearby objects 912, 914, and 918 along with a calculated gravitational force between object 912 and object 914. In this embodiment, object to object gravitational force is approximated.

OSpace may be used to test for collisions like loose octrees cited further above in this specification, however, using spheres in place of cubes is computationally faster and therefore more easily scaled up to handle larger numbers of object interactions. The basic principle is that a set of objects may be excluded from consideration by excluding the cell that contains them. If an object does not collide with a padded sphere (radius+pad) of the cell then it is guaranteed not to collide with any objects contained in that cell or any of that parent cells child cells. The distance formula is used in these calculations. OSpace requires minimally that only distances need to be calculated. The square root calculation typically required for cuboid cells can also be eliminated to further optimize computational efficiency.

If the padded sphere of a cell does collide with an object then the process needs to continue further down the octree, such as testing the child cells as well as any objects that may be retained in the parent (when the children have a pad value less than the object's radius). In this way, a tiered object sieve is created where the larger objects are higher up in the tree than the smaller objects. Since one can fit more small objects in a given space than large ones, this means there will be more objects further down in the tree.

In one embodiment, OSpace processing speed may be further optimized by adding one or more vector processing units such as one or more graphics processing units (GPU) to the simulation cluster architecture. A GPU may process many distance calculations simultaneously. Therefore, an OSpace system might be implemented using tools such as compute unified device architecture (CUDA). As mentioned earlier, in order to use AABBs, the extents of the bounding box must often be recalculated for each object. Since OSpace uses spheres to bound objects, there is no need for recalculation each time the object rotates. So the simulation engine is greatly optimized.

OSpace may be considered a broad phase algorithmic solution. In empirical tests, it has been determined that using Ospace in accordance with the several embodiments described herein, narrows down the number of collisions significantly and expediently. Therefore, the narrow phase requires much less processing compared to the processing load of AABB in testing for box overlap states.

In one embodiment of the present invention OSpace could be adapted to also test for box overlaps such that sphere test results and box test results might be considered before identifying a collision without departing from the spirit and scope of the present invention. A cell in OSpace retains standard attributes such as position and extents and uses the extents of the cube to determine the radius of a sphere that may circumscribe the cube. The cell further has a pad value defining the extension of a cell bounding sphere beyond the extents of the cube. Cube radius plus pad value is equal to the full radius of the sphere boundary. It is duly noted herein that a cube-circumscribed sphere may be used without having a pad value, however a pad value enables more uniform and efficient processing as the objects are more evenly distributed throughout (particularly lower) the octree.

A collision test doesn't find all overlapping padding spheres. It goes down the tree from the root, and for each "cube", it tests if there could be a collision with the largest object that could fit within the padding of a given padding sphere and the object that is being tested (the one that needs to know if it's colliding with anything). The object doing the search is the "target object" and any object in the tree a "tree object". For reference, a cube, specifically, is a region of space represented by a node in a tree.

To clarify, the padding sphere is some amount larger than the cube it pads. The padding sphere has a radius and the cube has half of its diagonal (line from the center to any corner). The padding sphere radius minus the cube's ½-diagonal determines the largest object that can fit inside of that cube. The test on a given cube determines if it is at all possible for anything within that cube to be colliding with the target object. If the padding sphere of the cube doesn't overlap with the sphere of the target object then no tree object inside that cube or its child cubes can overlap either, so we stop testing that branch of the tree (i.e. we don't test its children or any tree objects it contains). If the padding sphere does overlap then we test any tree objects in that cube as well as its child cubes (if there are any).

The padding sphere radius of a child cube is half that of its parent, so if a tree object that fits in the parent cube is too large to fit in a child cube (i.e. the padding radius of the child is smaller than the radius of the tree object), then the object will get "stuck" in the parent cube. Any tree objects that are added to the tree which are small enough to fit will get pushed down into the children if the parent ever sub-divides (due to the number of tree objects it holds reaching a threshold). Likewise, there is a lower threshold that determines if the parent should take all the tree objects in its children and delete the children. This means the larger the tree object, the higher up in the tree it will be because it got stuck earlier in the process. Also, the algorithm inherently ensures that if a parent takes the tree objects of its children and deletes the children, then those children have already done the same to their children (if they had any). So, any cube may have both tree objects and child cubes—or nothing, potentially (i.e. the tree objects within the bounds of its parent are either located in its siblings or stuck in the parent).

By testing "collision" between the target object and a padding sphere, we can avoid processing the child cubes and the tree objects within a given cube and all of its descendants. Now, this is where the inefficiency lies; since the locations of tree objects are contained within the bounds of their cube, the edge of the padding sphere is further out than the edge of any tree object's bounding sphere can reach. Except at the corners of the cube. At the corners of the cube, the edge of the bounding sphere of the largest tree object that can fit in the cube and the edge of the padding sphere meet (i.e. ½-diagonal of the cube plus maximum tree object radius for that cube equals padding sphere radius).

In this embodiment, there will be times where a padding sphere does overlap with a target object but nothing inside that cube or its descendants will overlap with the target object. This is almost always a minor performance hit because the padding sphere of a parent cube is twice that of its children. It is less likely that any of the children will also pass the collision test and false positives become increasingly less likely as we go down that branch. The performance hit is minor compared to the optimization of using the sphere-overlap test rather than a cube-overlap test, which is the method of prior art. Thus, my collision test is faster than that of prior art.

When an object is added to the tree (and it becomes a "tree object"), there is no need to test for collision with any padding spheres. Since we account for the largest possible tree object via the padding sphere, all we need to know is if the position of the candidate tree object lies within the bounds of the cube and if the bounding sphere radius of the candidate tree object is less than the padding size of the cube ("padding size" is padding sphere radius minus ½-diagonal of the cube).

It will be apparent to the skilled person that the arrangement of elements and functionality for the invention is described in different embodiments in which each is exemplary of an implementation of the invention. These exemplary descriptions do not preclude other implementations and use cases not described in detail. The elements and functions may vary, as there are a variety of ways the hardware may be implemented and in which the software may be provided within the scope of the invention. The invention is limited only by the breadth of the claims below.

I claim:

1. A system for simulating objects in a three-dimensional virtual space, comprising:
    a host computing node coupled to a network and executing a simulation engine from a non-transitory storage medium;
    padding spheres defined in the three-dimensional virtual space, one padding sphere fully encasing each cube in an octree;
    a plurality of objects defined in the three-dimensional virtual space, each object having recorded dimensions defining a maximum dimension of the object relative to dimensions of the three-dimensional virtual space, and tracked kw position in the three-dimensional virtual space;
    a visibility sphere uniquely associated with each object in the three-dimensional virtual space, the visibility sphere defining a spherical region at a radius around the associated object;
    at least one display, displaying objects in the three-dimensional virtual space;
    wherein, upon one of the objects becoming a target object by virtue of a change in position or condition, a search is initiated to determine objects to be rendered in the display, a first step in the search comprising identifying all padding spheres overlapped at least partially by the visibility sphere of the target object as candidate padding spheres, and identifying objects within or overlapping the candidate padding spheres, and a second step comprising, for each object identified in the first step, considering the object to be visible or not by determining a visibility ratio for each object of maximum dimension of the object divided by distance from the target object, and comparing that visibility ratio to a threShold ratio, any object having a visibility ratio equal to or greater than the threshold ratio deemed visible, and to be rendered in the display.

2. A method for simulating objects in a three-dimensional virtual space, comprising:
    determining a target object by virtue of a change in position or condition;
    identifying gill padding spheres, enclosing cubes in an octree defined in the three-dimensional virtual space, overlapped at least partially by a visibility sphere associated uniquely with the target object;
    identifying objects within or overlapping each of the intersected padding spheres as candidate objects;
    determining a visibility ratio for each candidate object as a maximum dimension of the object relative to dimensions of the three-dimensional virtual space, divided by distance of the candidate object from the target Object;

comparing the visibility ratio for each candidate object to a threshold ratio; deeming each object to be visible if the visibility ratio for the object is equal to or greater than the threshold ratio; and rendering the target object and the objects deemed visible in the display.

3. A system for simulating objects in a three-dimensional virtual space, comprising:
a host computing node coupled to a network and executing a simulation engine from a non-transitory storage medium;
padding spheres defined in the three-dimensional virtual space, one padding sphere fully encasing each cube in an octree:
a plurality of objects defined in the three-dimensional virtual space, each object tracked for position in the three-dimensional virtual space;
a light source at a known position in the three-dimensional virtual space, the light source having a radial boundary of a specific diameter, and a visibility sphere of a specific diameter;
a camera viewpoint at a specific position in the three-dimensional virtual space; and
at least one display, displaying objects in the three-dimensional virtual space;
wherein a search is initiated to determine objects to be rendered in the display, a first step in the search comprising identifying all padding spheres overlapped at least partially by the visibility sphere of the light source as candidate padding spheres, and identifying objects within or overlapping the candidate padding spheres as visible, to be rendered in the display, and a second step comprising constructing a visibility cone having a vertex at the camera viewpoint and a base diameter at the radial boundary of the light source, and discovering objects at least partially overlapped by the visibility cone, the overlapped objects also identified as visible, all objects identified as visible rendered in the display.

4. The system of claim 3 comprising moving the camera viewpoint, and reconsidering objects as visible.

5. The system of claim 3 comprising moving the light source and reconsidering objects as visible.

6. The system of claim 3 comprising changing the radial boundary of the light source and reconsidering objects as visible.

7. A method for simulating objects in a three-dimensional virtual space, comprising:
identifying all padding spheres, enclosing cubes in an octree defined in the three-dimensional virtual space, overlapped at least partially by a visibility sphere associated uniquely with a light source at a known position in the three-dimensional virtual space, the light source having a radial boundary of a specific diameter;
identifying objects within or overlapping each of the intersected padding spheres as visible objects;
constructing a visibility cone with a vertex at a camera viewpoint at a known position in the three-dimensional virtual space and a base diameter at the radial boundary of the light source, and discovering objects at least partially overlapped by the visibility, cone, the overlapped objects also identified as visible, all objects identified as visible objects to be rendered in the display.

8. The method of claim 7 comprising moving the camera viewpoint, and reconsidering objects as visible.

9. The method of claim 7 comprising moving the light source and reconsidering objects as visible.

10. The method of claim 7 comprising changing the radial boundary of the light source and reconsidering objects as visible.

11. A system for simulating objects in a three-dimensional virtual space, comprising:
a host computing node coupled to a network and executing a simulation engine from a non-transitory storage medium;
padding spheres defined in the three-dimensional virtual space, one padding sphere fully encasing each cube in an octree;
a plurality of objects defined in the three-dimensional virtual space, each object having a specific recorded mass, and a visibility radius and tracked for position in the three-dimensional virtual space; and
at least one display, displaying objects in the three-dimensional virtual space;
wherein, upon one of the objects becoming a target object by virtue of a change in position or condition, a search is initiated to determine objects to be rendered in the display, a first step in the search comprising identifying all padding spheres overlapped at least partially by the visibility radius of the target object as candidate padding spheres, and identifying objects within or overlapping the candidate padding spheres as candidates to be visible, to be rendered in the display, and a second step comprising determining a gravity force between the target object and each candidate object according to the masses of the objects and the distance between the objects, determining each object to be visible if the determined gravity force between the object and the target object is equal to or greater than a threshold gravity force, all objects identified as visible rendered in the display.

12. A method for simulating objects in a three-dimensional virtual space, comprising:
identifying all padding spheres, enclosing cubes in an octree defined in the three-dimensional virtual space, overlapped at least partially by a visibility sphere associated uniquely with a target objected selected by a change in position or condition, identifying objects within or overlapping each of the intersected padding spheres as candidate objects to be visible objects;
determining a gravity force between the target object and each candidate object according to the masses of the objects and the distance between the objects; and
determining each object to be visible if the determined gravity force between the object and the target object is equal to or greater than a threshold gravity force, all objects identified as visible rendered in the display.

* * * * *